US011878890B2

(12) United States Patent
Kleindienst

(10) Patent No.: US 11,878,890 B2
(45) Date of Patent: Jan. 23, 2024

(54) APPARATUS AND METHOD FOR FOLDING AND STOCKING BOOK DOCUMENTS

(71) Applicant: Muehlbauer GmbH & Co. KG, Roding (DE)

(72) Inventor: Uwe Kleindienst, Egidien (DE)

(73) Assignee: MUEHLBAUER GMBH & CO. KG, Roding (DE)

( * ) Notice: Subject to any disclaimer, the term of this patent is extended or adjusted under 35 U.S.C. 154(b) by 366 days.

(21) Appl. No.: 17/279,137

(22) PCT Filed: Nov. 27, 2019

(86) PCT No.: PCT/EP2019/082652

§ 371 (c)(1),
(2) Date: Mar. 24, 2021

(87) PCT Pub. No.: WO2020/109345

PCT Pub. Date: Jun. 4, 2020

(65) Prior Publication Data

US 2021/0395036 A1 Dec. 23, 2021

(30) Foreign Application Priority Data

Nov. 30, 2018 (DE) ......................... 102018009417.1

(51) Int. Cl.
*B65H 45/16* (2006.01)
*B42C 19/08* (2006.01)
(Continued)

(52) U.S. Cl.
CPC ........... *B65H 45/165* (2013.01); *B42C 19/08* (2013.01); *B65H 29/46* (2013.01); *B65H 29/62* (2013.01);
(Continued)

(58) Field of Classification Search
CPC .......... B65H 29/46; B65H 2301/42122; B65H 2301/4227; B65H 2301/3411; B65H 2701/1926; B42C 19/00; B42D 25/24
(Continued)

(56) References Cited

U.S. PATENT DOCUMENTS 4,799,661 A * 1/1989 Nail ........................ B65H 43/08
271/262
6,997,450 B2 * 2/2006 Trovinger .............. B65H 45/04
270/32
(Continued)

FOREIGN PATENT DOCUMENTS

DE 3100866 A1 1/1982
DE 202009010081 U1 10/2009
(Continued)

OTHER PUBLICATIONS

Espacenet machine translation of JP2012056188A; https://translationportal.epo.org/emtp/translate/?ACTION=description-retrieval&COUNTRY=JP&ENGINE=google&FORMAT=docdb&KIND=A&LOCALE=en_EP&NUMBER=2012056188&OPS=ops.epo.org/3.2&SRCLANG=ja&TRGLANG=en (Year: 2012).*

*Primary Examiner* — Leslie A Nicholson, III
(74) *Attorney, Agent, or Firm* — Shumaker, Loop & Kendrick, LLP; John A. Miller

(57) ABSTRACT

An apparatus for folding and receiving book documents comprises a main conveying device arranged and adapted to convey unfolded book documents in a main conveying direction and a secondary conveying device arranged and adapted to receive the book documents conveyed by the main conveying device and to convey them in a secondary conveying direction and/or against the secondary conveying direction, wherein the secondary conveying direction is transverse to the main conveying direction. Further, the apparatus comprises a receiving device arranged at a spatial
(Continued)

distance from the first and/or the second conveying surface and configured to receive folded book documents. The device folds the conveyed book documents respectively with a movement in the secondary conveying direction and/or against the secondary conveying direction. Furthermore, a lifting device is arranged to convey the folded book documents from the main conveying device and/or from the secondary conveying device into the receiving device.

9 Claims, 7 Drawing Sheets

(51) Int. Cl.
*B65H 29/46* (2006.01)
*B65H 29/62* (2006.01)

(52) U.S. Cl.
CPC . *B65H 45/167* (2013.01); *B65H 2301/42122* (2013.01); *B65H 2701/1926* (2013.01)

(58) Field of Classification Search
USPC .......................... 270/32, 52.14, 52.16, 52.04
See application file for complete search history.

(56) References Cited

U.S. PATENT DOCUMENTS

| | | | | |
|---|---|---|---|---|
| 7,660,556 | B2 * | 2/2010 | Saitsu | B65H 45/18 270/32 |
| 8,894,056 | B2 * | 11/2014 | Oshima | B65H 37/06 270/32 |
| 8,944,426 | B2 * | 2/2015 | Kasuga | B65H 39/10 270/32 |
| 2004/0222584 | A1 * | 11/2004 | Krieger | B65H 39/02 270/32 |
| 2005/0073082 | A1 * | 4/2005 | Wakabayashi | B42C 19/08 270/37 |
| 2011/0054672 | A1 * | 3/2011 | McFarland | B42C 19/08 198/644 |
| 2013/0038012 | A1 * | 2/2013 | Kasuga | B42C 1/12 270/32 |

FOREIGN PATENT DOCUMENTS

| | | | |
|---|---|---|---|
| DE | 102009053442 | A1 | 7/2011 |
| EP | 2292444 | A2 | 3/2011 |
| JP | 2010235305 | A | 10/2010 |
| JP | 2012056188 | A | 3/2012 |
| WO | 2009037414 | A2 | 3/2009 |

* cited by examiner

30
B'
32
33
34
36
37
38
B
H
H'
12
14
10
20
22
N
N'
OH
ON
1

F
1
11
10
B
20
24
30
N
N'

APPARATUS AND METHOD FOR FOLDING AND STOCKING BOOK DOCUMENTS

CROSS-REFERENCE TO RELATED APPLICATIONS

This application is a National Stage application of International Application No. PCT/EP2019/082652 filed on Nov. 27, 2019 which claims priority to German Patent Application Serial No. DE 10 2018 009 417.1 filed Nov. 30, 2018.

BACKGROUND

Field

Described herein are an apparatus and method for folding and holding or stocking book documents.

Discussion of the Related Art

In the production of book documents, for example passports or other foldable (security) documents, production lines with a large number of individual processing stations, for example printing stations or laser processing stations, are frequently used. The feasible overall speed of such a serial production arrangement is always determined by the slowest or most time-consuming (partial) production step.

The final folding and storage of the book documents, which are usually open or unfolded and are to be printed, for example, is a comparatively time-consuming production step that cannot be distributed to different processing stations.

In order to avoid a time delay in the overall production due to the final production step of folding and picking up or stocking, a production area for folding the book documents can be designed to be spacious so that the usually final production step of folding and picking up or stocking can be stretched over a longer conveying distance. This makes it possible to achieve a high conveying speed for the overall production arrangement so that the conveying throughput of the remaining production stations does not have to be reduced. However, this greatly increases the space requirement of the overall production arrangement. Furthermore, the usually relatively large pick-up device at the end of a complete production arrangement or production line also contributes to the increased space requirement of the last production station.

An example of known holding devices for folded book documents is disclosed by document DE 10 2009 053 442 A1.

Furthermore, the document DE 31 00 866 A1 discloses a machine for a system for collecting, binding and stacking magazines, books or book blocks, the machine having a conveyor line for this purpose. The disclosed machine is here arranged to rotate the conveyed magazines, books or book blocks and/or to deposit them on a stack.

The document EP 2 292 444 A2 discloses a device for the cyclic processing of a printed product by means of a transfer device which feeds the printed product to at least one further processing device. The transfer device is set up to convey the printed product with a rotary or quasi-rotary translational movement.

Further, the document DE 20 2009 010 081 U1 discloses a container for holding security documents provided by a production machine.

SUMMARY

The task is thus to provide a space-efficient, reliable production station with a high throughput capacity for folding and receiving or stocking book documents. Likewise, a method for folding and receiving or stocking book documents is to be provided.

The task is solved by a device according to the independent claim and by a method according to the subordinate method claim. Advantageous designs and further developments are defined by the subclaims.

A device for folding and receiving or storing book documents comprises a main conveying device with a first conveying surface, which is arranged and designed to convey unfolded book documents in a main conveying direction over the first conveying surface, and a secondary conveying device with a second conveying surface, which is arranged and designed to receive the book documents conveyed by the main conveying device and to convey them in a secondary conveying direction and/or against the secondary conveying direction over the second conveying surface, the secondary conveying direction running at an angle/transversely, in particular orthogonally, to the main conveying direction. Furthermore, the device comprises a receiving device which is arranged at a spatial distance from the first and/or the second conveying surface, in particular above the main conveying device and/or the secondary conveying device, and is designed to receive folded book documents. The device is designed to fold the conveyed book documents in each case with a movement in the secondary conveying direction and/or against the secondary conveying direction. Furthermore, a lifting device is arranged and adapted to convey the folded book documents from the main conveying device and/or from the secondary conveying device into the receiving device.

Conveying a book document in a conveying or lifting direction within the meaning of this patent is to be understood as an intended controlled movement of the book document in three-dimensional space along a predetermined two-dimensional straight line in a predetermined direction of extension of the straight line. Where relationships are defined between the individual conveying or lifting directions, the definitions (e.g., angular/transverse, orthogonal, parallel) refer respectively to the directions of extension of the corresponding two-dimensional straight lines and/or to the orientation of movement along those straight lines (e.g., opposite, same direction). In other words, it can be described that a direction of motion denotes an axis of motion, wherein motion along the axis of motion occurs in a predetermined orientation/direction.

A conveying surface for the purposes of this patent means the surface of a conveying device over which the book documents are conveyed. The conveying surfaces within the meaning of this patent are to be understood as at least substantially planar or two-dimensional surfaces over which the book documents are moved in a conveying direction. The directions of movement or axes of movement of the book documents in three-dimensional space always run parallel to the at least substantially planar or two-dimensional conveying surfaces when conveying unfolded or unfolded book documents. In other words, it can be described that the conveying surfaces of the conveying devices each designate a two-dimensional surface in three-dimensional space over which an unfolded or unfolded book document is moved.

The conveying surface of the secondary conveying device can be arranged parallel to the conveying surface of the main conveying device. In particular, the conveying surface of the secondary conveying device may be adjacent to the conveying surface of the main conveying device at an angle of 180°. The conveying surface of the secondary conveying device and the conveying surface of the main conveying device may lie in a common two-dimensional surface in three-dimensional space. Alternatively, the conveying surface of the secondary conveying device may have an angle not equal to 180° with respect to the conveying surface of the main conveying device, in particular an angle between 180° and 100° inclusive, preferably an angle between 160° and 120° and particularly preferably an angle of 150°.

If a conveying device is, for example, a circulating conveyor belt or similar device, in which at least parts of the conveying device move along together with the book documents in a conveying direction, the conveying surface of such a device is to be understood in the sense of this patent as an at least substantially flat or two-dimensional surface in three-dimensional space, through which the extended surface of the conveyor belt (or comparable device) facing the book documents and in contact with the book documents moves in the conveying direction.

For the purposes of this patent, a conveying of a book document in the secondary conveying direction and against the secondary conveying direction refers to an operation in which a book document is first conveyed in the secondary conveying direction and then conveyed against the secondary conveying direction, or an operation in which a book document is first conveyed against the secondary conveying direction and then conveyed in the secondary conveying direction. In other words, it can be described that conveying a book document "in the secondary conveying direction and against the secondary conveying direction" refers to moving the book document back and forth in a sequential or staggered manner.

On the one hand, the arrangement according to the invention is particularly space-efficient and/or compact, since the receiving device and/or the document storage device can be arranged directly above a conveying device, for example a production line. In particular, the receiving device can be spaced apart from the conveying surface of the secondary conveying device and/or the conveying surface of the main conveying device at least to such an extent that an unfolded and/or a folded book document can be conveyed away under the receiving device in the main conveying direction and/or in the secondary conveying direction and/or against the secondary conveying direction. In other words, the pick-up device can in particular be spaced apart from the conveying surface of the secondary conveying device and/or the conveying surface of the main conveying device at least to such an extent in the direction of the book document conveyed on the secondary conveying device and/or on the main conveying device that a folded and/or an unfolded book document can be arranged on a conveying surface of the secondary conveying device and/or the conveying surface of the main conveying device and between the secondary conveying device and/or the main conveying device and the pick-up device without the book document touching the conveying device.

On the other hand, the proposed device is very reliable and operates in a time-efficient manner, since the folding of the book documents can be performed by a secondary conveying device. The auxiliary conveyor device can perform the folding of a book document independently of a cycle of the main conveyor device, for example while the main conveyor device is temporarily stopped to allow other processing stations, for example a printing station, to process the book documents. The angular arrangement of the secondary conveying device or secondary conveying direction transverse to the main conveying device or main conveying direction also contributes to a compact structure or space-efficient design of the overall conveying device.

The main conveying device and/or the secondary conveying device can be cyclic conveying devices.

The main conveying device and/or the secondary conveying device may include conveyor belts, horizontal slides, conveyor rollers, sliding surfaces, conveying grippers, conveying cams, conveyor belts, and/or rotating carriers.

The lifting device for the folded book documents can convey the book documents in a lifting direction which runs transversely, preferably at least substantially orthogonally, to the main conveying direction and/or to the secondary conveying direction. In other words, it may be described that the lifting direction may be parallel to a surface normal of the conveying surface of the main conveying device and/or parallel to a surface normal of the conveying surface of the secondary conveying device. In particular, the lifting device may convey the book documents from the secondary conveying device and/or the main conveying device toward the receiving device. Moreover, the lifting device may be at least partially retractable in the main conveying device and/or in the secondary conveying device, for example into a correspondingly suitable recess of the main conveying device and/or of the secondary conveying device. Furthermore, the lifting device may be at least partially liftable into the receiving device, which is arranged above the main conveying device and/or above the secondary conveying device.

An advantage here is that the lifting device can on the one hand be integrated space-efficiently into the main conveying device and/or into the secondary conveying device and on the other hand can lift the folded book documents into a likewise space-efficiently arranged receiving device, wherein the receiving device can be arranged directly above the main conveying device and/or the secondary conveying device. In particular, the receiving device may be arranged directly above a conveying path of the book documents in the main conveying direction. A space-saving implementation of the overall arrangement is thus further improved.

Further, the receiving device may be arranged and configured to receive the received folded book documents respectively in a plane parallel to the book documents conveyed by the main conveying device and/or to the book documents conveyed by the auxiliary conveying device. In other words, the receiving device may receive the folded book documents respectively arranged one above the other and respectively arranged parallel to each other, wherein the received book documents may also be respectively stored parallel to the book documents not yet folded on the main conveying device and/or on the secondary conveying device. The receiving device can further be arranged and designed to store the respectively last received folded book document with an extended surface facing the main conveying device and/or the secondary conveying device.

In one variant, the receiving device can also have at least one, in particular two or more, retaining element(s), which are each designed and arranged to fix the received folded book documents in the receiving device. The retaining elements may be, in particular, flexible plastically deformable device elements and/or device elements movable in dependence on a movement of the lifting device, which permit a pick-up of folded book documents by the pick-up device, but impede a movement of the picked-up book documents out of the pick-up device, for example due to an influence of gravity. A movement of the restraining elements may be synchronized to a movement of the lifting device. Alternatively or additionally, the lifting device may be designed and arranged to at least partially elastically deform the retaining elements during a movement into the receiving device.

Optionally, the pick-up device can have a fill level sensor that detects how many folded book documents are picked up by the pick-up device. The fill level sensor can, for example, be an optical or haptic sensor. In the event that the pickup device is filled to a predetermined level, the fill level sensor may cause a warning signal, for example a warning tone, to be output and/or cause the pickup device to be automatically emptied or replaced. Furthermore, the pick-up device may comprise an output unit that outputs the picked-up folded book documents individually or in groups, for example to an operator of the manufacturing device or to an automated unloading unit.

In one variant, the main conveying device and/or the auxiliary conveying device can have at least one inspection sensor, for example an optically or electromagnetically sensing inspection sensor, for inspecting the conveyed book documents. The main conveying device and/or the auxiliary conveying device may be arranged and configured to convey the conveyed book documents into a reject receptacle depending on an inspection by the at least one inspection sensor.

In other words, the main conveying device and/or the secondary conveying device may be arranged and configured to either reject a conveyed book document and convey it into the reject receptacle or not reject it and convey it to the lifting device, which further conveys the book documents into the receiving device, depending on an inspection by the at least one inspection sensor.

One advantage here is that only non-rejected book documents are kept in stock, while rejected book documents can be sorted out immediately by the production system. This reduces the need for subsequent inspection of the book documents.

The main conveying device may further comprise at least one stop element, for example a stop pin and/or a stop bar, which is raised from the first conveying surface, in particular in a direction orthogonal to the main conveying direction. The at least one stop element can receive or fix the book documents conveyed by the main conveying device in a predetermined stop position and/or secure the book documents conveyed by the main conveying device against unintentional displacement and/or falling out. In other words, it can be described that the book documents conveyed by the main conveying device can be fixed in a predetermined stop position by means of the stop element and/or that the at least one stop element can limit the conveying path of the book documents along the main conveying direction. Optionally, the at least one stop element can be at least partially retractable in the main conveying device, in particular in a direction orthogonal to the main conveying direction.

Optionally, the main conveying device or the secondary conveying device can have an additional stop element, which is arranged in particular in an area below the receiving device or the document storage device on the main conveying device or on the secondary conveying device. The additional stop element may comprise, for example, a stop pin and/or a stop bar and may project from the conveying surface of the main conveying device and/or the secondary conveying device, in particular in a direction orthogonal to the main conveying direction and/or orthogonal to the secondary conveying direction. The additional stop element can receive or fix the book documents conveyed by the secondary conveying device in a predetermined stop position and/or secure the book documents conveyed by the secondary conveying device against unintentional displacement and/or falling out. In other words, it can be described that the book documents conveyed by the secondary conveying device can be fixed in a predetermined stop position by means of the additional stop element and/or that the additional stop element can limit the conveying path of the book documents along the secondary conveying direction. Optionally, the at least one stop element may be at least partially retractable in the main conveying device and/or in the secondary conveying device, in particular in a direction orthogonal to the main conveying direction and/or to the secondary conveying direction. In one variant, the additional stop element can be, for example, a stop bar that is arranged parallel to the main conveying direction of the book documents in an area below the receiving device or the document storage device on the main conveying device and limits conveying of the book documents against the secondary conveying direction.

For folding the book documents, the device for folding and receiving or storing book documents may comprise a folding device. However, the folding device need not be formed by a uniformly implemented assembly of device elements in all embodiments. Rather, the folding device may also be formed by various device elements of the main conveying device, the secondary conveying device and/or the receiving device that functionally cooperate to fold the conveyed book documents. In particular, a folding device in the sense of the invention may comprise the following device elements.

The folding device can comprise at least one gripper and/or at least one clamp and/or at least one horizontal pusher, which are each arranged and designed to move a book document in the secondary conveying direction and/or against the secondary conveying direction. The gripper and/or the clamp and/or the horizontal pusher may in particular be formed together with the secondary conveying device. The gripper and/or the clamp and/or the horizontal pusher can be designed to fix or hold a book document conveyed by the main conveying device in an edge region of the book document, to move it and then to release it again.

Further, the folding device may comprise at least one (vertical) pusher arranged and configured to at least partially lift at least a part of a book document. The (vertical) pusher may be movable in a lifting direction which is at least substantially orthogonal to the main conveying direction and/or to the secondary conveying direction and/or substantially parallel to the lifting direction of the lifting device. Moreover, the (vertical) pusher may be at least partially retractable in the main conveying device and/or in the secondary conveying device, for example into a correspondingly suitable recess of the main conveying device and/or of the secondary conveying device. Furthermore, in one variant, the (vertical) slide can be formed together/integrally with the lifting device and/or in each case be raised simultaneously/parallel with the lifting device in the lifting direction or lowered against the lifting direction.

The conveyed book documents can have a prepared folding line or a prepared folding axis, which divide the book documents in particular mirror-symmetrically. The book documents can in particular be conveyed through the main conveying device in such a way that the folding axis runs parallel to the main conveying device and/or orthogonally to the secondary conveying direction. A book document held/fixed in an edge region, for example by a gripper, can thus be at least partially lifted/folded when the (vertical) pusher below a non-held/fixed half of the book document is lifted in a lifting direction beyond a conveying plane/conveying surface of the main conveying device and/or secondary conveying device. The auxiliary conveying device and/or the at least one gripper and/or the at least one clamp and/or the at least one horizontal pusher can be designed to move a held/fixed book document into an area above the (vertical) pusher before it is lifted, so that lifting the (vertical) pusher causes the book document to be lifted/folded.

In this context, lifting/folding the book document means pivoting a part of the book document, in particular a book document half, about the prepared folding line or prepared folding axis of the book document, so that the pivoted part of the book document encloses an angle of less than 180° with the non-pivoted part of the book document.

Further, the folding device can have at least one guide element, which is arranged and designed to guide a book document that is at least partially raised/folded and/or moved in the secondary conveying direction and/or against the secondary conveying direction along a predetermined path of movement. The guide element can, for example, be a substantially arcuate metal, ceramic or plastic rail and/or comprise driven or non-driven roller elements or circulation belts.

For example, a book document held/fixed by a gripper and already partially lifted/folded by a (vertical) pusher can be moved by the gripper and/or the secondary conveying device in the secondary conveying direction and/or against the secondary conveying direction so that the book document comes into contact with the guide element. By a further movement in the secondary conveying direction and/or against the secondary conveying direction, the already at least partially lifted/folded book document can be lifted/folded further, whereby the (vertical) pusher can be moved back against the lifting direction.

Furthermore, the folding device may comprise at least one pressing element, which is movable in a direction substantially orthogonal to the main conveying direction and/or to the secondary conveying direction and is designed and arranged to fold a book document moved in the secondary conveying direction and/or against the secondary conveying direction and/or guided by the guide element. The pressing element can be movable in the lifting direction of the lifting device and/or can be lowered and/or raised in a direction parallel to the lifting direction of the lifting device. In particular, the pressing element can be lowered onto an already partially folded/collapsed book document so that it exerts a pressing force on the book document while the book document is moved away under the pressing element. The pressing element can in particular comprise drivable or non-drivable roller elements and/or drivable or non-drivable circulating elements/belts, which are arranged and designed to be brought into contact with the book document to be folded in order to exert a pressing force on the book document.

An advantage of the roller elements and/or the circulation belts is that a movement of the at least partially folded book document away under the pressing element can be supported or improved. The movement of the book document away under the pressing element can be effected here, for example, by the secondary conveying device and/or by the at least one gripper and/or by the at least one clamp and/or by the at least one horizontal pusher in the secondary conveying direction and/or counter to the secondary conveying direction. Alternatively or supplementarily, the movement of the book document away under the pressing element can also be effected by a drivable roller element and/or a drivable circulating element/circulating belt of the pressing element. In particular, the book document can be conveyed over a sliding surface of the secondary conveying device and/or the main conveying device under the pressing element.

The folding of the book document can be produced by moving the folded book document in the secondary conveying direction and/or against the secondary conveying direction under the pressing element, which exerts a pressing force on the book document.

Optionally, the pressing element and/or at least a part of the pressing element can be pivotably arranged about an axis on the device for folding and receiving or storing book documents, in particular on the receiving device. An advantage of the pivotable mounting of the pressing element (or a part of the pressing element) is that a partially folded/lifted book document can be gripped behind by the pivotable pressing element during a lowering of the pressing element, so that a pivoting back of the pressing element gripping behind the book document further improves or supports a folding or a folding of the book document.

Further, the folding device can comprise at least one guide roller which is arranged and designed to guide and/or convey a book document moved in the secondary conveying direction and/or against the secondary conveying direction and/or folded/lifted by the (vertical) pusher and/or folded or folded by the pressing element. In particular, the guide roller may be arranged on the pick-up device and may be independently driven or not independently driven. The guide roller may be arranged and configured to exert a pressing force on a conveyed folded book document, which is conveyed over a sliding surface of the secondary conveying device and/or the main conveying device under the guide roller. In particular, the guide roller can be arranged and designed to convey a folded or collapsed book document into the area above the lifting device or below the pick-up device, so that the lifting device can convey the folded book document into the lifting device.

In one embodiment, the folding of the book document may be produced by moving the folded book document in the secondary conveying direction or against the secondary conveying direction under the guide roller which exerts a pressing force on the book document. Optionally, the pressing element can exert a pressing force on the conveyed/moved book documents in order to fold them, and the guide roller can subsequently exert a pressing force on the book documents in order to fold them, wherein the pressing force exerted by the guide roller on the book documents can in each case be greater than the pressing force exerted by the pressing element on the book documents.

Furthermore, embodiments are expressly possible which do not have a pressing element. The folding and the folding of the book documents that are at least partially folded/lifted by the (vertical) pusher and/or the book documents that are guided by the guide element can be carried out here solely by the guide roller and/or by an interaction of the guide roller with a conveyor roller.

Optionally, the device for folding and receiving or storing book documents may further comprise a conveyor roller, which may be at least partially received in a recess of the main conveyor device and/or the secondary conveyor device. In particular, the conveying roller can be accommodated in the main conveying device and/or the secondary conveying device in such a way that the roller surface or the roller shell surface of the conveying roller is at least substantially flush with the conveying surface of the main conveying device and/or the conveying surface of the secondary conveying device and/or forms with the conveying surface of the main conveying device and/or the conveying surface of the secondary conveying device an at least substantially planar contact surface for the book documents. The conveyor roller may or may not be independently driven. In particular, the conveyor roller may comprise a self-contained drive unit. Optionally, the conveyor roller may further comprise a conveyor belt guided over the roller shell surface, which may improve the friction and/or contact properties of the conveyor roller.

The conveyor roller can be arranged in an area between the (vertical) pusher and the lifting device. In particular, the conveyor roller can be arranged in the area of the guide roller, in particular opposite to the guide roller, so that the guide roller and the conveyor roller cooperate for folding or for exerting a pressing force on the book documents and/or for conveying the book documents against the secondary conveying direction. The axis of rotation of the conveying roller can run parallel to the guide roller and/or parallel to the main conveying device.

One advantage of the conveyor roller is that a movement of the book documents in the secondary conveying direction and in particular also against the secondary conveying direction can be improved by the conveyor roller. For example, an independently driven conveyor roller can convey the book documents against the secondary conveying direction, in particular away from under the guide roller into the area below the pick-up device or above the lifting device. The conveying roller can cause the book documents to be conveyed in the secondary conveying direction and also counter to the secondary conveying direction, in particular even if the book documents are not or are no longer fixed and/or conveyed by a gripper and/or a clamp and/or a horizontal pusher, and/or are not or are no longer in contact with a pressing element.

In one variant, the device for folding and receiving or storing book documents can have a control or regulation system, in particular electronic and/or integrated, which is implemented together with the (overall) device and/or is connected to the (overall) device in a separable or inseparable manner. The control device can control and/or regulate the movements and/or the drives and/or the synchronization of the individual device components. In particular, the control device can synchronize and coordinate the timing of the movements of the individual moving parts of the (overall) device and control or regulate the respective drives of the moving parts, which are not described in more detail above. Optionally, the control system may have sensors for quality and sequence control. The control system can be set up to detect the time synchronization of the motion sequences independently or automatically on the basis of the detection of the sensors for quality and sequence control and to improve or coordinate or synchronize them.

Optionally, the control system can also evaluate information from the inspection sensor and/or store information about the book documents rejected by the device. In a further development, the control system can automatically order renewed production of the rejected book documents by the preceding production stations in the production chain, so that rejected documents are automatically produced again.

One advantage here is that incorrectly produced book documents can be replaced automatically.

A method for folding and holding or stocking book documents includes the steps of:

Conveying unfolded book documents in one main conveying direction;

Picking up the book documents conveyed in the main conveying direction with a secondary conveying device and conveying the book documents in a secondary conveying direction and/or against the secondary conveying direction, the secondary conveying direction running transversely/angularly, in particular orthogonally, to the main conveying direction;

Folding of the conveyed book documents with a movement of the book documents in the secondary conveying direction and/or against the secondary conveying direction;

Conveying the folded book documents into a receiving device which is arranged at a spatial distance from a conveying surface of the main conveying device and/or a conveying surface of the secondary conveying device, in particular above the main conveying device and/or the secondary conveying device, and is designed to receive folded book documents.

Optionally, the method may further comprise at least one of the following steps:

Gripping and/or clamping the conveyed book documents with a gripper and/or a clamp and moving the book documents in the secondary conveying direction and/or against the secondary conveying direction;

At least partial lifting of the promoted book documents with a (Vertical) slider;

Guiding a book document that is at least partially lifted and/or moved in the secondary conveying direction and/or against the secondary conveying direction along a predetermined movement path with a guide element;

Conveying an at least partially folded/raised and/or folded book document in the secondary conveying direction and/or against the secondary conveying direction with a conveying roller and/or a guide roller;

Folding of a book document moved in the secondary conveying direction and/or against the secondary conveying direction and/or guided by the guide element with a pressing element.

The sequence of execution of the process steps indicated above can be carried out in the sequence of process steps indicated here or in any other sequence.

An advantage of the device disclosed here and of the method disclosed here for folding and receiving or storing book documents is that the necessary movement of the book documents to a receiving device is combined or interlocked with the sequence of a folding process, so that the storage of the finished book documents and the folding of the book documents are performed with a common sequence of movements. On the one hand, this enables a compact design of the disclosed device and, on the other hand, a time-efficient sequence of the storage and folding process. Furthermore, in particular by a (temporally staggered) back and forth movement of the book document to be folded, an arrangement of the receiving device directly above the conveying path of the unfolded book documents is made possible, so that the spatially compact feasibility of the device disclosed here is further improved.

BRIEF DESCRIPTION OF THE DRAWINGS

Further objectives, features, advantages and application possibilities result from the following description of non-restrictive embodiment examples with reference to the associated drawings. In this context, all the features described and/or illustrated show, individually or in any combination, the object disclosed here, also irrespective of their grouping in the claims or their back-relationships. The dimensions and proportions of the components shown in Fig. are not to scale; they may differ from those illustrated here in embodiments to be implemented.

DETAILED DESCRIPTION OF THE EMBODIMENTS

Figures 1, 2:
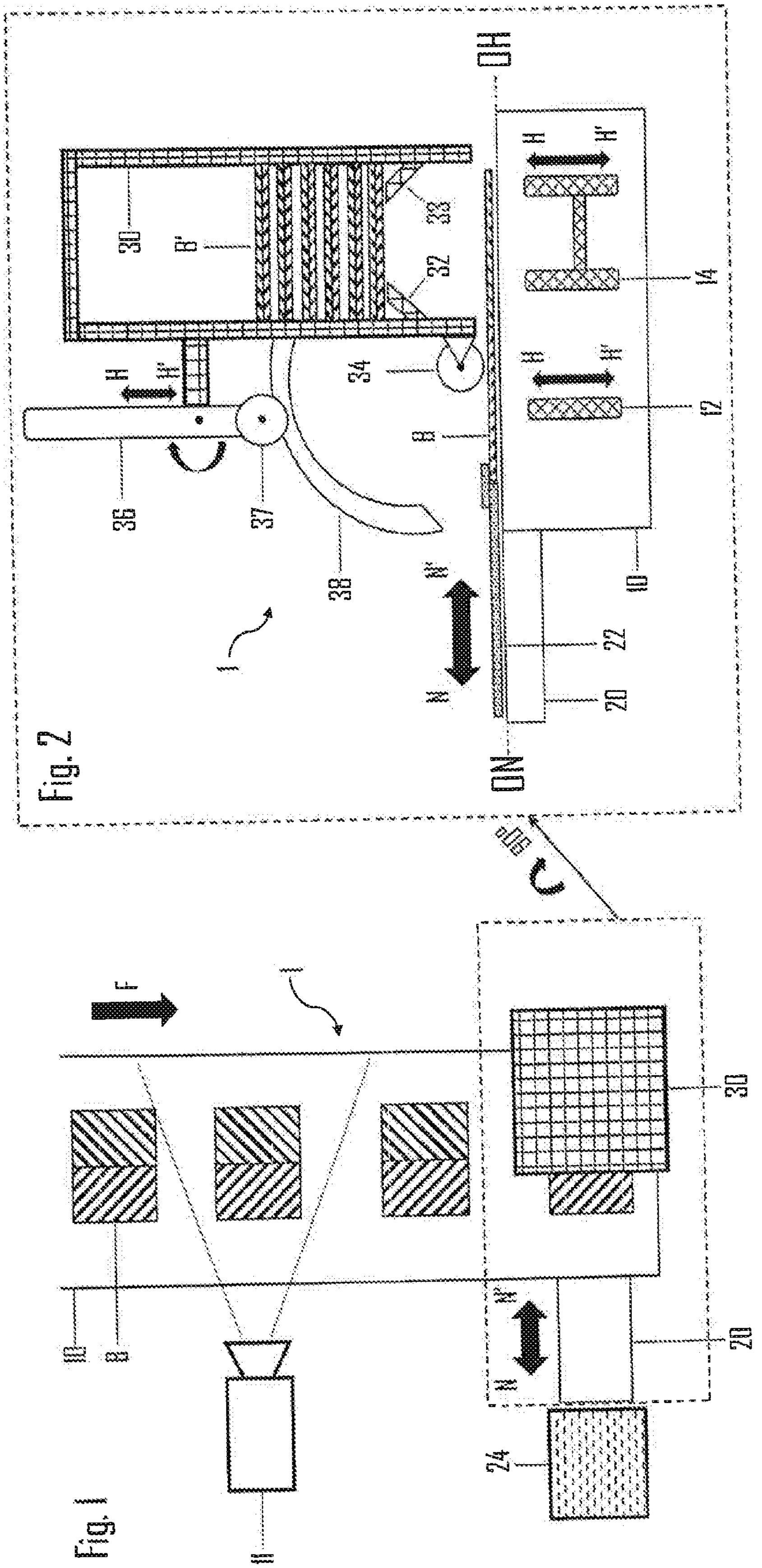
FIG. 1 schematically shows an example of a device for folding and holding book documents in a plan view.
FIG. 2 schematically shows a section of the device example shown in FIG. 1 from a perspective rotated by 90°.

FIG. 1 shows an example of a device or apparatus 1 for folding and receiving book documents in a plan view. A main conveying device 10 conveys the book documents B in cycles in the main conveying direction F.

The book documents B have a prepared folding line or folding axis centrally dividing the book documents B, which pivotably connects a first and a second book document half. In the example shown, the folding line or folding axis runs essentially parallel to the main conveying direction F.

A receiving device 30 is arranged above the main conveying device 10, which is designed to receive the book documents B in a folded state.

Furthermore, FIG. 1 shows the secondary conveying device 20 in a top view. The auxiliary conveying device 20 is designed to move the book documents B conveyed in cycles by the main conveying device 10 in a respective auxiliary conveying direction N and (following the movement of the book documents B in the auxiliary conveying direction N) to move the book documents B against the auxiliary conveying direction N' in each case.

The example shown in FIG. 1 further comprises an inspection sensor 11 and a reject receptacle 24. The inspection sensor 11, which in the specific example is a camera sensor, checks the book documents B conveyed by the main conveying device 10 with a control unit (not shown) in each case for property and position errors. If a property error or an uncorrectable position error of a book document B is detected by the control system, the control system causes the secondary conveying device 20 to convey the defective book document B into the reject receptacle 24. In the example shown, this is done by the secondary conveying device 20 conveying the defective book document beyond a predetermined point in the secondary conveying direction N and then releasing it. Thus, in the example shown in FIG. 1, the control system decides whether a book document B conveyed in each case by the main conveying device 10 is either conveyed by the secondary conveying device 20 into the reject receptacle 24 or, after further conveying steps, passes into the receiving device 30 arranged above the main conveying device 10, these two options being mutually exclusive.

FIG. 2 shows a section of the device 1 shown in FIG. 1 for folding and holding book documents from a perspective rotated by 90°.

Further details of the device, which are also covered by the device shown in FIG. 1 but are not shown for reasons of overview, are described on the basis of FIG. 2 as representative of both Figs.

As shown schematically in FIG. 2, the secondary conveying device 20 comprises a gripper 22 which is designed to grip a book document B conveyed by the main conveying device 10. In the specifically shown example, the shown gripper 22 is a part of the secondary conveying device 20 and is movable both in the secondary conveying direction N and against the secondary conveying direction N', so that a reciprocating movement of the book document B fixed by the gripper 22 in each case is made possible. The gripper 22 is designed to engage in each case in an edge region of the book documents B conveyed cyclically by the main conveying device 10 or on a book document half, so that the book document half not fixed in each case by the gripper 22 is connected pivotably about the prepared folding line or folding axis to the book document half fixed by the gripper 22.

In other embodiments (not shown), the secondary conveying device 20 may alternatively or in addition to the gripper 22 also comprise conveyor belts, horizontal slides, conveying rollers, conveying cams, conveying belts and/or rotating carriers, each of which is configured and arranged to convey the book documents B in the secondary conveying direction N and/or against the secondary conveying direction N'.

Further, FIG. 2 shows the receiving device 30 for the folded book documents B' in a cross-sectional view. In the example shown, the receiving device 30 is arranged above the main conveying device 10, but in other embodiments it can also be arranged above the secondary conveying device 20 or above both conveying devices.

The receiving device 30 shown has, on a side facing the main conveying device 10, an opening for receiving folded book documents B', the opening of the receiving device 30 being arranged above a lifting device 14 and allowing folded book documents B' to pass through. Furthermore, the specifically shown receiving device 30 comprises two retaining elements 32, 33 which secure the folded book documents B' received in the receiving device 30 against falling out or moving out of the opening, for example due to the acting gravity and/or vibrations of the device. In the specific example, the two restraining elements 32, 33 are elastically deformable or flexible spring elements made of a metal material, but in other embodiments they may also be non-elastic movable elements made of a metal or non-metal material. In particular, movable hinges and/or spring hinges may also serve as restraining elements.

The receiving device 30, shown only schematically in FIG. 2, is designed to receive and/or stack a plurality of folded book documents B' and may have further features not shown in Figs. for overview reasons, for example an unloading opening or unloading flap for removing/moving out the stored book documents.

The lifting device 14 shown in FIG. 2 and already mentioned is completely recessed in a recess of the main conveying device 10 in a rest state so that it does not block the conveying path of the book documents B conveyed in cycles by the main conveying device 10. Further, the lifting device 14 shown can be raised in the lifting direction H, which is orthogonal to the main conveying direction F and the secondary conveying direction N, and lowered in the opposite direction to the lifting direction H'. The lifting device 14 is arranged below the opening of the receiving device 30 and is suitable for lifting a folded book document B' into the receiving device 30.

FIG. 2 further shows the vertical slide 12, which is also completely recessed in a recess of the main conveyor device 10 in a resting state and can be raised in the lifting direction H and lowered against the lifting direction H'. In the example shown, the vertical pusher 12 is not arranged below the receiving device 30. However, this is not necessary in all embodiments of a device for folding and receiving book documents. Furthermore, in the embodiment shown, the vertical pusher 12 is not coupled to the lifting device 14 and is formed separately therefrom. However, embodiments are also possible in which the vertical pusher 12 is formed jointly and/or integrally with the lifting device 14 and/or in which the vertical pusher 12 and the lifting device 14 are always raised or lowered synchronously or uniformly.

Further, FIG. 2 shows a guide roller 34 arranged on the receiving device 30, which is designed to come into contact with a folded book document moving in the secondary conveying direction N or against the secondary conveying device N' and to exert a pressing force on a folded book document. However, the guide roller 34 does not come into contact with an unfolded book document B conveyed by the main conveying device 10, since the unfolded book documents B are passed under the guide roller 34 by the main conveying device 10 (substantially parallel to the axis of rotation of the guide roller 34).

Furthermore, FIG. 2 shows a pressing element 36 which can be raised in the lifting direction H and lowered against the lifting direction H' and which is arranged on the receiving device 30 so as to be pivotable about an axis substantially parallel to the main conveying direction H. The pressing element 36 is arranged on the receiving device 30 so as to be pivotable about an axis substantially parallel to the main conveying direction H'. In addition, the pressing-on element 36 has the circulating roller 37, over which a driven circulating belt (not shown) is guided. The pressing element 36 is designed to be lowered onto a book document conveyed by the secondary conveying device 20 in the secondary conveying direction N or against the secondary conveying direction N' and to exert a pressing force on the book document with the circulating belt guided over the circulating roller 37. This is further described with reference to the following Fig.

Further, FIG. 2 shows the arcuately configured guide rail 38, which in the specific example shown is also arranged/fixed to the receiving device 30. In the example shown, the guide rail 38 is a metal rail coated with Teflon, which is designed to be brought into contact with a part of a book document B conveyed or moved by the secondary conveying device 20 against the secondary conveying direction N', so that at least a part of the book document B brought into contact moves along a movement path predetermined by the guide rail 38.

In addition, FIG. 2 schematically shows the conveying surface OH of the main conveying device 10 and the conveying surface ON of the secondary conveying device 20. As schematically shown in FIG. 2, the first conveying surface OH and the second conveying surface ON in the example shown form a common surface or adjoin each other at an angle of 180°. In the example shown, the conveying surfaces OH, ON of the conveying devices 10, 20 are the surfaces of the conveying devices 10, 20 over which the book documents B are respectively conveyed and of the surfaces of the conveying devices 10, 20 with which the conveyed book documents B are arranged or moved/conveyed in contact. The receiving device 30 is arranged at least so far away from the conveying surfaces OH, ON of the conveying devices 10, 20 that it does not hinder conveying of the book documents in the main conveying direction F and in the secondary conveying direction N as well as against the secondary conveying direction N'.

The process of folding and picking up book documents with a device shown in FIGS. 1 and 2 is illustrated schematically and by way of example in FIGS. 3 to 10.

Figure 3:
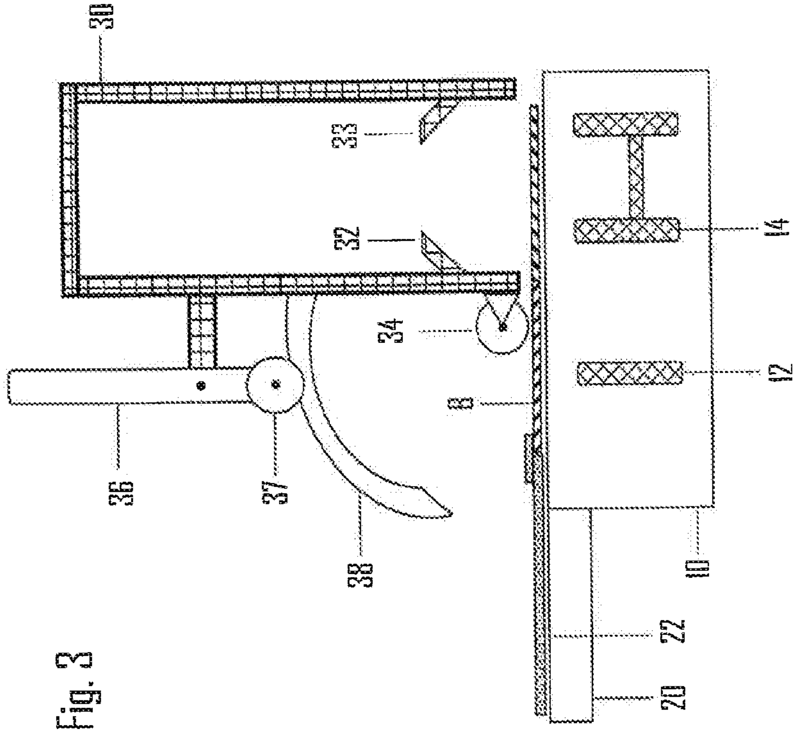

FIG. 3 shows the device shown in FIG. 2, wherein initially an unfolded book document B conveyed by the main conveying device 10 is conveyed into an area below the receiving device 30 and is fixed at one side by the gripper 22 of the secondary conveying device 20. In the example shown in FIG. 3, the prepared folding line of the book document B is located below an edge of the receiving device 30 arranged above the main conveying device 10. Thus, initially a part or a half of the book document B conveyed cyclically by the main conveying device 10 in the main conveying direction F is located below the receiving device 30, wherein the unfolded book document B initially does not come into contact with the guide roller 34 arranged on the receiving device 30.

Figure 4:
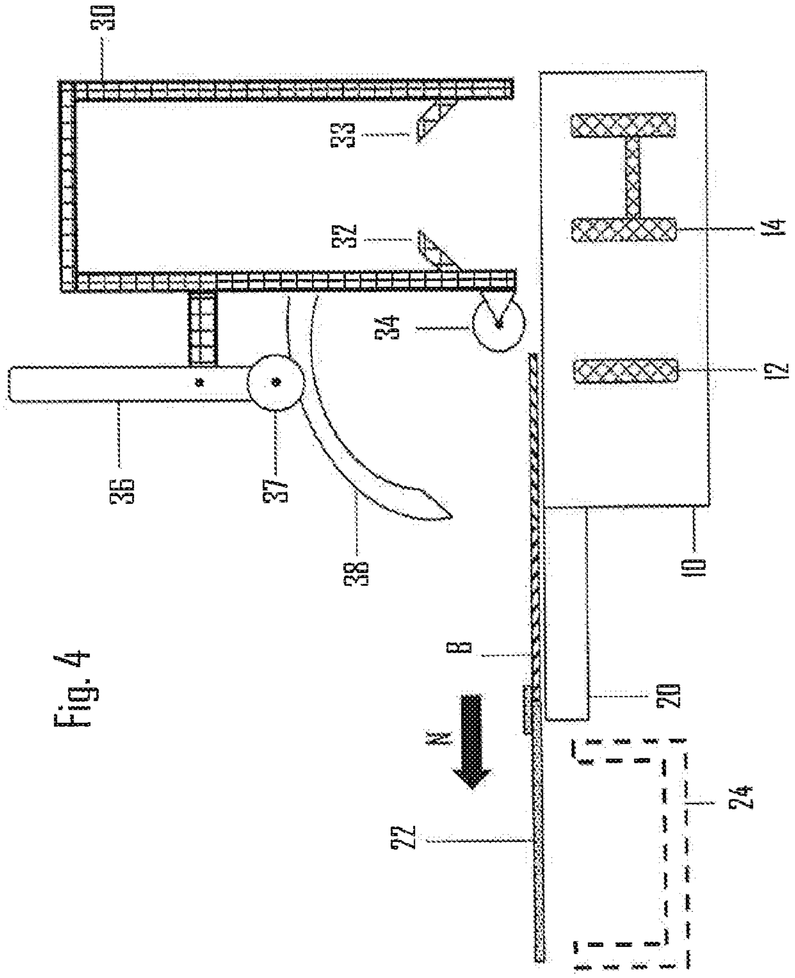
FIGS. 3 to 10 show schematically and by way of example a sequence of folding and recording of book documents with the method shown in FIG. 1 and the device shown in FIG. 2.

FIG. 4 shows how the secondary conveying device 20 or the gripper 22 initially conveys or moves/pulls the book document B fixed by the gripper 22 in the secondary conveying direction. The book document B is thereby moved out of an area below the opening of the receiving device 30.

If the book document B has been identified as defective by the control system (not shown) using the inspection sensor 11 shown in FIG. 1, the gripper 22 can convey/move the book document B beyond an outer edge of the auxiliary conveyor device 20 and then release it so that the defective book document B falls into the reject receptacle 24, which is only indicated in FIG. 4.

However, for clarification of the further manufacturing steps for folding and receiving the book documents B, it is assumed in the examples shown in Fig. that the book documents B shown are not to be discarded in each case.

Figure 5:
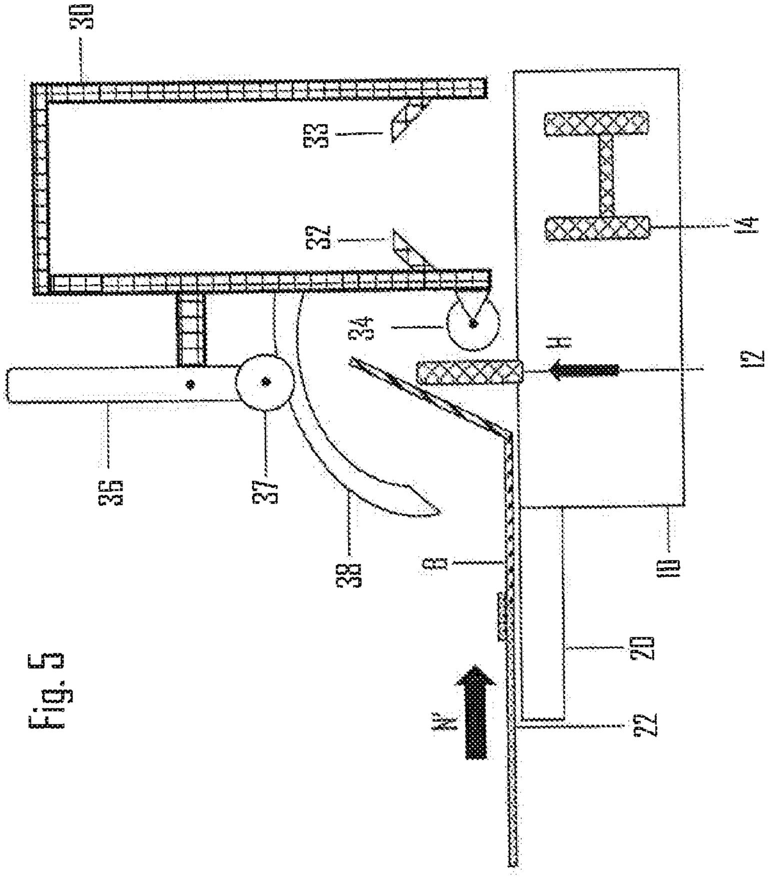

FIG. 5 shows how a part of the book document B or a book document half is lifted by the now following lifting of the vertical pusher 12.

The vertical pusher 12 is moved out of the main conveying device 10 in the lifting direction H, whereby the book document B fixed by the gripper 22 is located above the vertical pusher 12 with a book document half not directly fixed by the gripper. This causes the book document B to be folded. In other words, it can be described that the book document half not fixed by the gripper 22 is pivoted about the folding line or folding axis by the vertical pusher 12 relative to the book document half fixed by the gripper 22, so that the two book document halves enclose an angle of less than 180°. In particular, this can also occur simultaneously with a movement/conveying of the book document B against the secondary conveying direction N' caused by the secondary conveying device 20 and/or by the gripper 22, so that the secondary conveying device 20 and/or the gripper 22 (by a horizontal movement) and the vertical pusher 12 (by a vertical movement) can cause the book document to be folded. This can further accelerate the execution of the method for folding the book documents.

Furthermore, the book document B is brought into contact with the arcuate guide rail 38 by the lifting of a book document half by the vertical pusher 12 in the lifting direction H and/or by the conveying or movement against the secondary conveying direction N'. The book document half lifted or folded by the vertical pusher 12 is guided by the guide rail 38 along a predetermined path of movement, while the secondary conveying device 20 and/or the gripper 22 continue to move the book document B to be folded against the secondary conveying direction N'.

Figure 6:
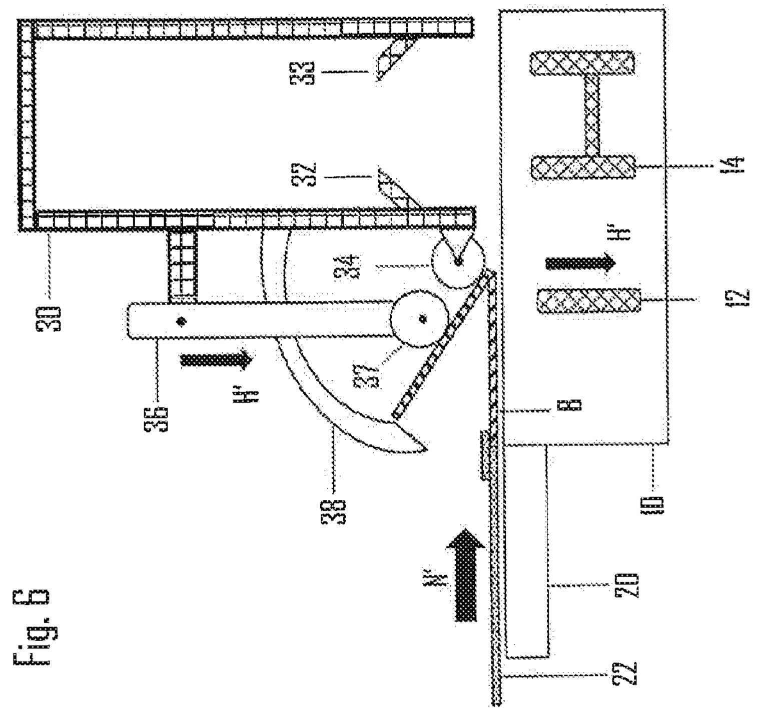

FIG. 6 shows the lowering of the pressing element 36 with the circulating roller 37 onto the book document to be folded against the lifting direction H'. After the book document half has been lifted or folded, the vertical slide 12 is lowered again in the main conveying device 10 against the lifting direction H', so that it does not stand in the way of further movement or conveying of the book document B by the gripper 22 or by the secondary conveying device 20 or clears the conveying path against the secondary conveying direction N'.

The pressing element 36 is lowered onto the book document B to be folded, so that the circulating belt guided over the circulating roller 37 (not shown for overview reasons) comes into contact with the book document B and exerts a pressing force against the lifting direction H' on the book document B. In other words, it can be described that the pressing element 36 with the circulating roller 37 and the circulating belt guided over the circulating roller 37 exerts a pressing force in the direction of the main conveying device 10 on the book document B to be folded, so that the book document B is folded.

Figure 7B:
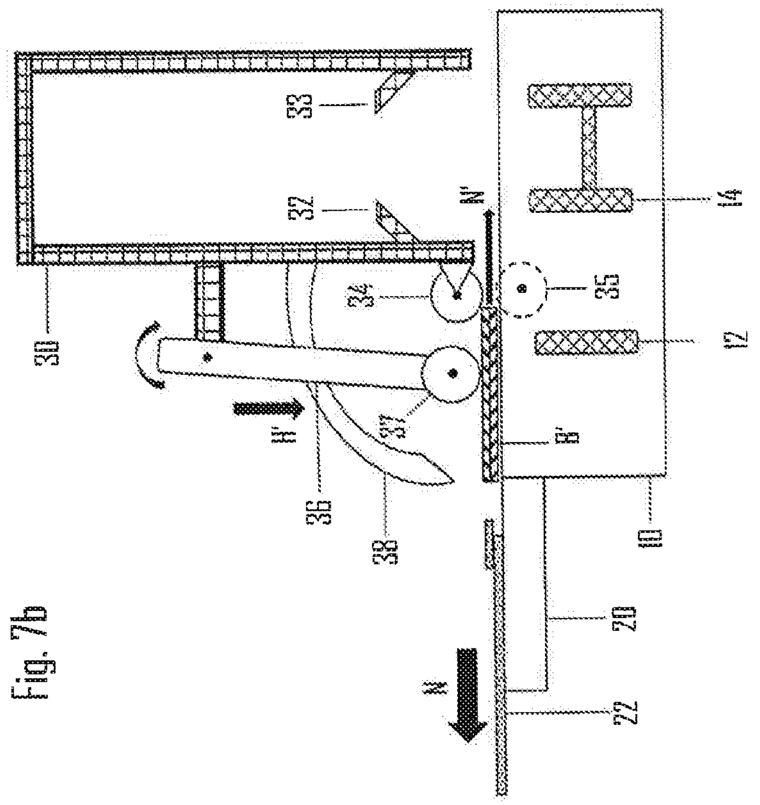
Figure 7A:
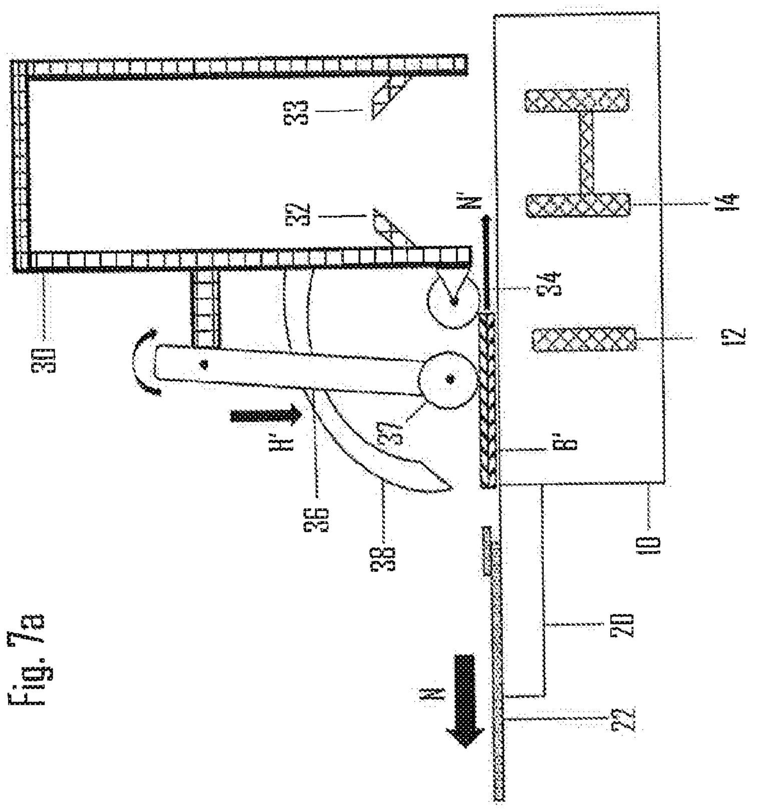

FIG. 7*a* shows that the gripper 22 or the secondary conveyor device 20 now releases the book document B' folded by the pressing element 36. The gripper 22 is moved away from the folded book document B' in the secondary conveying direction N, whereby the folded book document B' is moved further against the secondary conveying direction N' over the main conveying device 10 by the circulating belt guided over the circulating roller 37. The folded book document B' thereby comes into contact with the guide roller 34, which, like the conveyor belt guided over the circulating roller 37, exerts a pressing force on the folded book document B' in the direction of the main conveyor device 10. The guide roller 34 thus cooperates with the pressing element 36 in the folding of the book document B' or improves the folding of the book document B' effected by the pressing element 36. Moreover, to improve the folding or to improve the exertion of a pressing force on the folded book document B', the pressing element 36 can be pivoted about a pivot axis substantially parallel to the main conveying direction F.

FIG. 7*b* shows, in deviation from FIGS. 1 to 7*a* and FIGS. 8 to 11, an example of a device for folding and picking up book documents with an additional conveyor roller 35. In the example shown in FIG. 7*b*, the conveyor roller 35 is an independently driven conveyor roller that is partially recessed in the main conveyor device 10. In the example shown, the axis of rotation of the conveying roller 35 runs parallel to the axis of rotation of the guide roller 34. The conveying roller 35 supports the conveying of the folded book document B' against the secondary conveying direction N' and cooperates with the guide roller 34 and/or the pressing element 36 for folding the book document or for exerting a pressing force on the book document.

Figure 8:
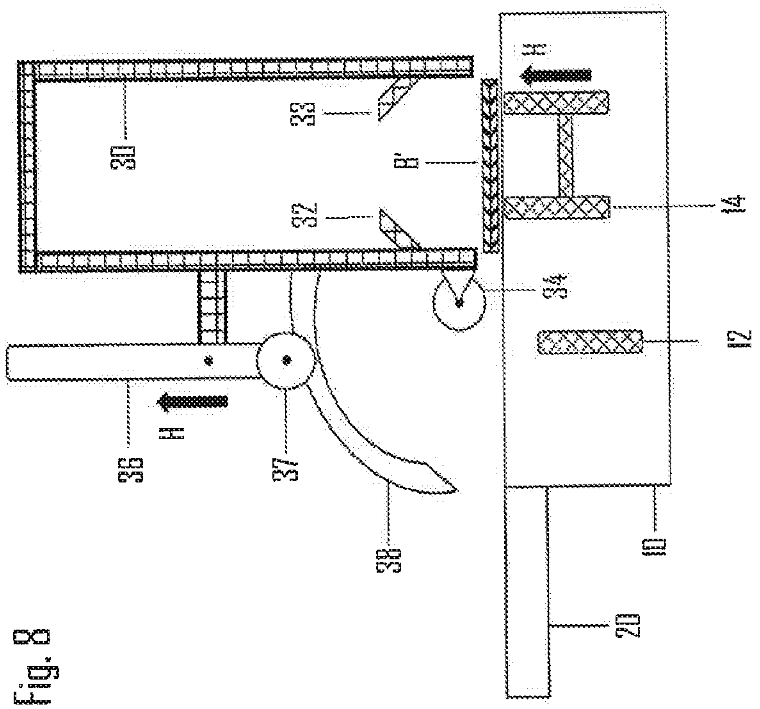

As shown in FIG. 8, the folded book document B' thus reaches an area above the lifting device 14 recessed in the main conveying device 10 or an area below the opening of the receiving device 30. The receiving device 30 is spaced from the conveying surface OH of the main conveying device 10 to such an extent that it does not impede the movement of the folded book document B'.

The pressing element 36 with the circulating roller 37 is raised in the lifting direction H to clear the conveying path for the further book documents B to be conveyed by the main conveying device 10.

The lifting device 14 arranged below the folded book document B' or the opening of the receiving device 30 is now lifted in the lifting direction H. The lifting device 14 is then lifted by the lifting device 30.

Figure 9:
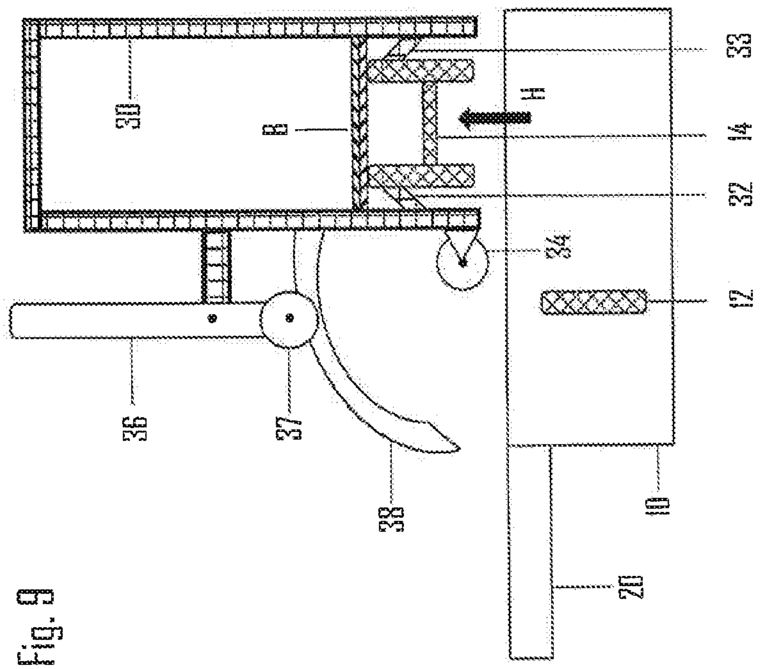

As shown in FIG. 9, the lifting device 14 conveys the folded book document B' in the lifting direction H through the opening of the receiving device 30 into the receiving device 30. Here, the lifting device 14 deforms the flexible plastically deformable retaining elements 32, 33 with the conveyed book document B', so that the folded book document B' passes into the interior of the receiving device 30.

Figure 10:
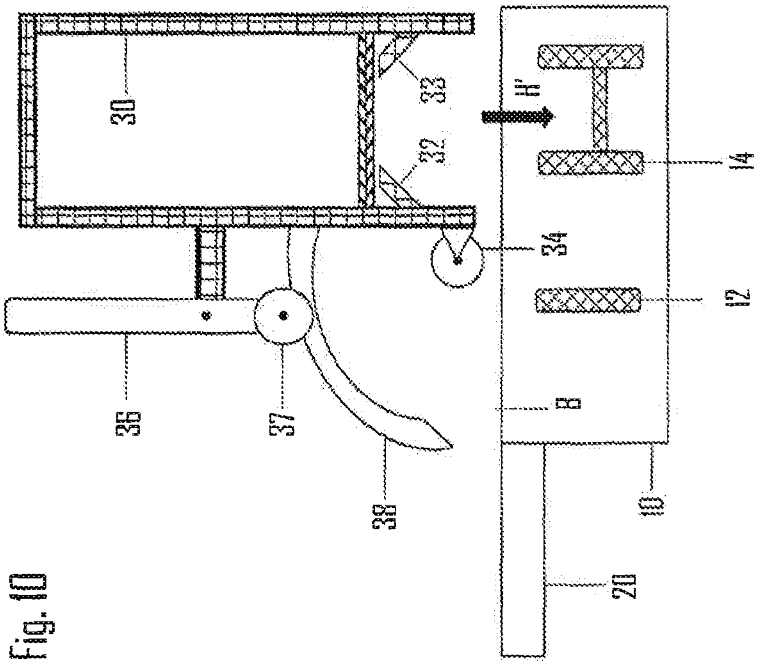

FIG. 10 shows that after a subsequent lowering of the lifting device 14 against the lifting direction H', the flexible plastically deformable retaining elements 32, 33 fix the folded book document B' inside the receiving device 30 or secure the folded book document B' against falling out of the receiving device 30 due to gravity by blocking/impeding a movement of the folded book document B' against the lifting direction H'.

The lifting device 14, which is lowered back into the main conveying device 10 against the lifting direction H', frees the conveying path for further book documents to be conveyed cyclically through the main conveying device 10, so that—as shown in FIG. 3—a further book document B to be folded in each case can be conveyed into the area below the receiving device 30.

Figure 11:
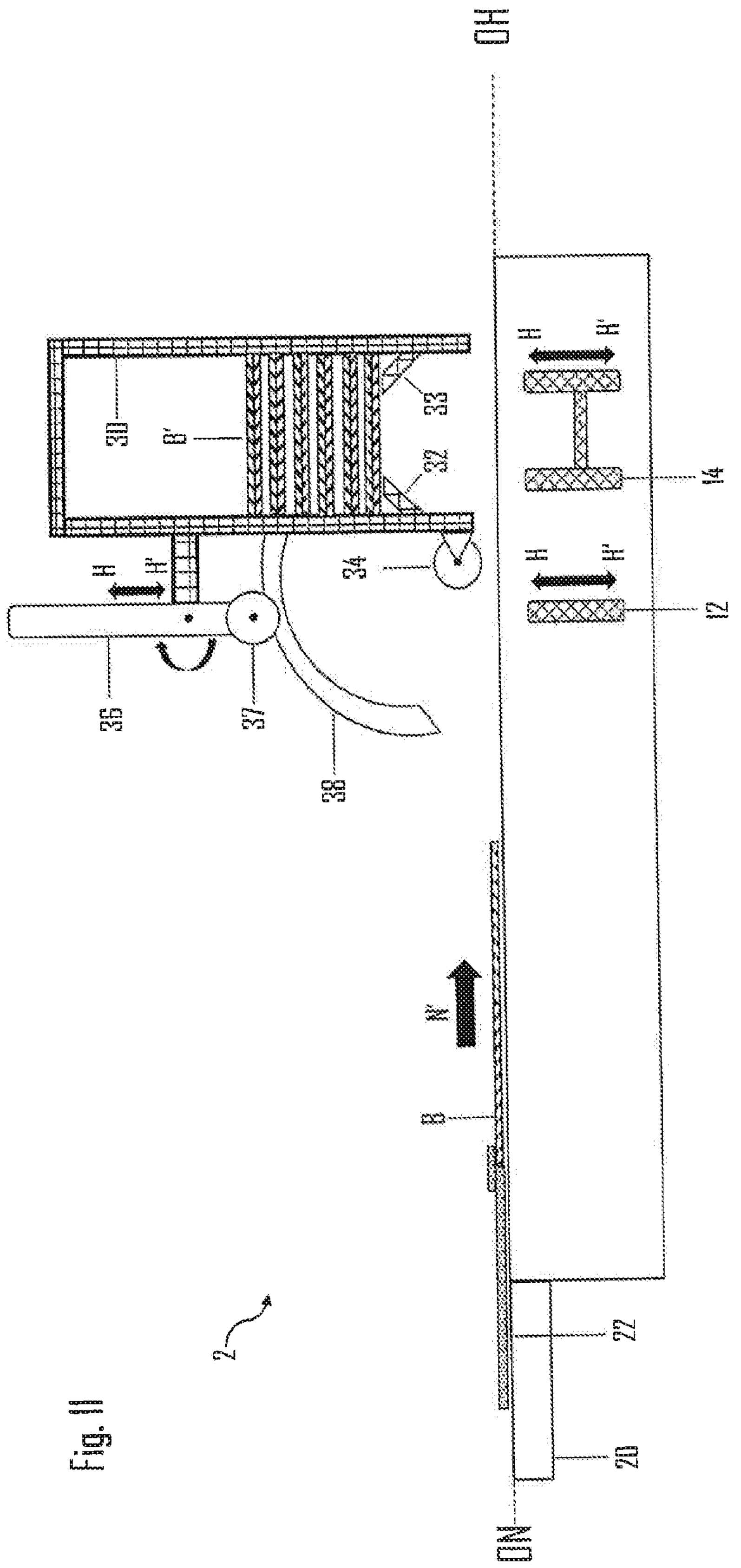
FIG. 11 shows an alternative implementation example for a device for folding and holding book documents in a side view.

FIG. 11 schematically shows an alternative structure of a device 2 for folding and picking up book documents, in which all process steps for folding and picking up the book documents B can be carried out exclusively with a movement of the book document B against the secondary conveying direction N' (and in the lifting direction H). Deviating from the device shown in FIGS. 1 to 10, the book documents B are here first conveyed by the main conveying device 10 into an area next to the receiving device 30, so that a conveying/moving of the book documents B in the secondary conveying direction N can be dispensed with. As illustrated by FIG. 11, however, such a device requires a considerably larger installation space or has a considerably larger space requirement. In addition, even with a device 2 as shown in FIG. 11, the secondary conveying device 20 or the gripper 22 must be moved back and forth in the course of production (or moved in the secondary conveying direction N and against the secondary conveying direction N'). The distance over which the auxiliary conveyor device 20 or the gripper 22 must be moved is increased compared to a device 1 as shown in FIGS. 1 to 10.

The variants described above, as well as their structural and operational aspects, are merely intended to provide a better understanding of the structure, operation and characteristics; they do not limit the disclosure to the embodiments, for example. The Figs. are schematic, with significant features and effects shown, in some cases significantly enlarged, to illustrate the functions, operating principles, technical embodiments and features. In this regard, each mode of operation, principle, technical embodiment and feature disclosed in the Fig. or in the text can be freely and arbitrarily combined with all claims, each feature in the text and in the other Fig., other modes of operation, principles, technical embodiments and features contained in or resulting from this disclosure, so that all conceivable combinations of the described variants can be assigned. Combinations between all individual embodiments in the text, that is, in any section of the description, in the claims, and also combinations between different variants in the text, in the claims, and in the Figs. are included. Also, the claims do not limit the disclosure and thus the possible combinations of all disclosed features with each other. All disclosed features are also explicitly disclosed herein individually and in combination with all other features.

The invention claimed is:

1. An apparatus for folding and receiving book documents, comprising:

a main conveying device having a first conveying surface arranged and configured to convey unfolded book documents in a main conveying direction over the first conveying surface, a secondary conveying device with a second conveying surface, which is arranged and designed to receive book documents conveyed by the main conveying device and to convey them in a secondary conveying direction and against the secondary conveying direction over the second conveying surface, the secondary conveying direction running transversely to the main conveying direction, and a receiving device arranged at a spatial distance from the first and/or the second conveying surface and adapted to receive folded book documents, wherein the apparatus is designed to fold the conveyed book documents in each case with a movement of the book documents in the secondary conveying direction and against the secondary conveying direction, and wherein a lifting device is arranged and designed to convey the folded book documents from the main conveying device and/or from the secondary conveying device into the receiving device, and wherein the lifting device is at least partially retractable in the main conveyor device and/or in the secondary conveyor device, and wherein the lifting device can be lifted at least partially into the receiving device.

2. The apparatus according to claim 1, wherein the lifting device conveys the folded book documents in a lifting direction which is at least substantially orthogonal to the main conveying direction and/or to the secondary conveying direction.

3. The apparatus according to claim 1, wherein the receiving device is further arranged and configured to receive the received folded book documents respectively in a plane parallel to the book documents conveyed by the main conveying device and/or to the book documents conveyed by the secondary conveying device, and/or the receiving device is further arranged and configured to store respective last received folded book document with an extended surface facing the main conveying device and/or the secondary conveying device, and/or the receiving device further comprises at least one retaining element that is designed and arranged to fix the received folded book documents in the receiving device.

4. The apparatus according to claim 1, wherein the main conveying device and/or the secondary conveying device have at least one inspection sensor, for example an optically or electromagnetically detecting inspection sensor, for inspecting the conveyed book documents, and/or the main conveying device and/or the secondary conveying device are further arranged and configured to convey the conveyed book documents into a reject receptacle depending on an inspection.

5. The apparatus according to claim 1, further comprising a folding assembly comprising:

at least one gripper and/or at least one clamp and/or one horizontal pusher, which are each arranged and designed to move a book document in the secondary conveying direction and/or against the secondary conveying direction, and/or at least one conveyor roller arranged and configured to move a book document in the secondary conveying direction and/or against the secondary conveying direction, and/or at least one pusher arranged and designed to at least partially lift a book document, and/or at least one guide element, which is arranged and designed to guide a book document, which is at least partially lifted and/or moved in the secondary conveying direction and/or against the secondary conveying direction, along a predetermined movement path, and/or at least one pressing element which is movable in a direction substantially orthogonal to the main conveying direction and/or to the secondary conveying direction and is designed and arranged to fold a book document moved in the secondary conveying direction or against the secondary conveying direction and/or guided by the guide element, and/or at least one guide roller, which is arranged and designed to guide and/or convey a book document moved against the secondary conveying direction and/or folded by the pusher and/or folded by the pressing element.

6. The apparatus according to claim 5, wherein the pressing element can be pivoted in a controlled manner about at least one axis, and/or the pressing element comprises a drivable, in particular independently drivable, circulation element, and/or the guide roller is drivable, in particular independently drivable, and/or the conveyor roller is independently drivable, and/or the pusher is movable substantially parallel to the direction of movement of the lifting device, and/or the pusher is at least partially retractable in the main conveying device and/or in the secondary conveying device, and/or the gripper and/or the clamp and/or the horizontal pusher are part of the secondary conveying device and/or are formed together with the secondary conveying device.

7. The apparatus according to claim 1, further comprising:

an electronic control device that is implemented together with the apparatus and/or is connected to the apparatus in a separable or inseparable manner, wherein the control device controls and/or regulates the movements and/or the drives and/or the synchronization of the individual device components.

8. A method for folding and recording book documents, with the steps:

conveying unfolded book documents in a main conveying direction;

picking up the book documents conveyed in the main conveying direction with a secondary conveying device and conveying the book documents in a secondary conveying direction and against the secondary conveying direction, the secondary conveying direction running transversely to the main conveying direction;

folding the conveyed book documents with a movement of the book documents in the secondary conveying direction and/or against the secondary conveying direction; and conveying the folded book documents into a receiving device, which is arranged at a spatial distance from a conveying surface of a main conveying device and/or a conveying surface of the secondary conveying device and is designed to receive folded book documents, with a lifting device, wherein the lifting device is at least partially retractable in the main conveyor device and/or in the secondary conveyor device, and wherein the lifting device can be lifted at least partially into the receiving device.

9. The method according to claim 8, further comprising at least one of the steps:

gripping and/or clamping the conveyed book documents with a gripper and/or a clamp and moving the book documents in the secondary conveying direction and/or against the secondary conveying direction;

at least partial lifting of the conveyed book documents with a pusher;

guiding a book document, which is at least partially raised and/or moved in the secondary conveying direction and/or against the secondary conveying direction, along a predetermined path of movement with a guide element;

conveying an at least partially folded/raised and/or folded book document in the secondary conveying direction and/or against the secondary conveying direction with a conveying roller and/or a guide roller;

folding of a book document moved in the secondary conveying direction and/or against the secondary conveying direction and/or guided by the guide element with a pressing element.

* * * * *